(12) United States Patent
Sun

(10) Patent No.: US 10,326,861 B2
(45) Date of Patent: Jun. 18, 2019

(54) METHOD FOR CONTROLLING COOPERATION OF MULTIPLE INTELLIGENT DEVICES AND APPARATUS THEREOF

(71) Applicant: TENCENT TECHNOLOGY (SHENZHEN) COMPANY LIMITED, Shenzhen (CN)

(72) Inventor: Danqing Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 356 days.

(21) Appl. No.: 15/211,348

(22) Filed: Jul. 15, 2016

(65) Prior Publication Data
US 2016/0330297 A1 Nov. 10, 2016

Related U.S. Application Data

(63) Continuation of application No. PCT/CN2015/098902, filed on Dec. 25, 2015.

(30) Foreign Application Priority Data

Dec. 31, 2014 (CN) .......................... 2014 1 0849620

(51) Int. Cl.
*G06F 15/16* (2006.01)
*H04L 29/06* (2006.01)
(Continued)

(52) U.S. Cl.
CPC .......... *H04L 67/42* (2013.01); *H04L 12/2818* (2013.01); *H04L 51/32* (2013.01);
(Continued)

(58) Field of Classification Search
CPC ..... H04L 67/72; H04L 12/2818; H04L 51/32; H04L 67/10; H04L 67/26
(Continued)

(56) References Cited

U.S. PATENT DOCUMENTS

2008/0256218 A1* 10/2008 Kinoshita .......... H04N 7/17318
709/219
2012/0266091 A1 10/2012 Kim et al.
(Continued)

FOREIGN PATENT DOCUMENTS

CN 101854672 A 10/2010
CN 102830799 A 12/2012
(Continued)

OTHER PUBLICATIONS

International Search Report for PCT/CN2015/098902 dated Mar. 24, 2016 (22 pgs) English Translation included.
(Continued)

*Primary Examiner* — Liang Che A Wang
*Assistant Examiner* — Kaylee J Huang
(74) *Attorney, Agent, or Firm* — Brinks Gilson & Lione

(57) ABSTRACT

A method for controlling an intelligent device and an apparatus thereof, which relate to the technical field of the internet of things, are provided. The method includes: receiving a first intelligent device identification and first intelligent device state information transmitted by a first intelligent device; determining a second intelligent device associated with the first intelligent device and a first target operation corresponding to the first intelligent device state information based on the first intelligent device identification, the first intelligent device state information and a social application account which is currently logged into; and transmitting a control message to the second intelligent device based on a second intelligent device identification
(Continued)

and the first target operation, such that the second intelligent device performs the first target operation.

17 Claims, 12 Drawing Sheets

(51) Int. Cl.
　　*H04L 29/08*　　　(2006.01)
　　*H04L 12/58*　　　(2006.01)
　　*H04L 12/28*　　　(2006.01)
　　*G06Q 50/00*　　　(2012.01)

(52) U.S. Cl.
　　CPC ............. *H04L 67/10* (2013.01); *H04L 67/26* (2013.01); *G06Q 50/01* (2013.01); *H04L 67/12* (2013.01)

(58) Field of Classification Search
　　USPC ................ 709/203, 217, 218, 219, 224, 227
　　See application file for complete search history.

(56) References Cited

U.S. PATENT DOCUMENTS

| | | |
|---|---|---|
| 2014/0036158 A1 | 2/2014 | Zheng et al. |
| 2014/0244768 A1 | 8/2014 | Shuman et al. |
| 2014/0335897 A1* | 11/2014 | Clem .................. G08G 1/0112 455/456.3 |
| 2014/0365593 A1 | 12/2014 | Sun |
| 2015/0134116 A1 | 5/2015 | Li et al. |
| 2015/0350146 A1* | 12/2015 | Cary ....................... H04W 4/90 709/206 |
| 2016/0043905 A1* | 2/2016 | Fiedler .................. G06F 3/0482 715/736 |

FOREIGN PATENT DOCUMENTS

| | | |
|---|---|---|
| CN | 103024193 A | 4/2013 |
| CN | 103237064 A | 8/2013 |
| CN | 103257873 A | 8/2013 |
| CN | 103616860 A | 3/2014 |
| CN | 103926890 A | 7/2014 |
| CN | 103957249 A | 7/2014 |
| CN | 104006493 A | 8/2014 |
| CN | 104093077 A | 10/2014 |
| CN | 104121663 A | 10/2014 |
| CN | 104144093 A | 11/2014 |
| CN | 104618440 A | 5/2015 |
| EP | 2 930 705 A1 | 10/2015 |
| EP | 2 990 943 A1 | 3/2016 |
| WO | WO 2015/135386 A1 | 9/2015 |

OTHER PUBLICATIONS

Office Action dated Aug. 11, 2016 for Chinese Application No. 201410849620.2, 7 pages.
Office Action dated Nov. 15, 2016 for Chinese Application No. 201410849620.2, 8 pages.
Extended European Search Report for corresponding European Patent Application No. 15864307.2 dated Jul. 18, 2018, 9 pages.

* cited by examiner

METHOD FOR CONTROLLING COOPERATION OF MULTIPLE INTELLIGENT DEVICES AND APPARATUS THEREOF

The present application is the Continuation Application of International Application No. PCT/CN2015/098902, titled "METHOD FOR CONTROLLING INTELLIGENT DEVICE AND APPARATUS THEREOF", and filed on Dec. 25, 2015, which claims the priority to Chinese Patent Application No. 201410849620.2, titled "METHOD FOR CONTROLLING INTELLIGENT DEVICE AND APPARATUS THEREOF", filed on Dec. 31, 2014 with the State Intellectual Property Office of People's Republic of China, both of which are incorporated herein by reference in their entireties.

TECHNICAL FIELD

The disclosure relates to the technical field of internet of things, and in particular to a method for controlling an intelligent device and an apparatus thereof.

BACKGROUND

With the rapid development of the internet of things, an increasing number of intelligent devices join the internet of things. These intelligent devices may be controlled to cooperate with each other through the internet of things, so as to provide users with more abundant intelligence services.

Currently, in order to control the intelligent device, a user needs to install on a terminal an intelligent device application for controlling an intelligent device and an intelligent service application for controlling the intelligent device application and needs to set, based on IFTTT (if this then that) technology, a corresponding IFTTT rule in the intelligent service application for the intelligent device. After that, the intelligent service application transmits control information to the intelligent device application based on the IFTTT rule corresponding to the intelligent device, such that the intelligent device application controls the intelligent device to cooperate. For example, the intelligent device includes an intelligent bracelet and an air conditioner, and the IFTTT rule set in the intelligent service application is that: increase temperature of the air conditioner once the intelligent bracelet detects that body temperature of the user is lower than or equal to a temperature threshold. Once the intelligent bracelet detects that the body temperature of the user is lower than or equal to the temperature threshold, the intelligent bracelet transmit temperate information to the intelligent service application through an intelligent bracelet application. The intelligent service application transmit a temperature adjusting request to an air conditioning application, such that the air conditioning application increases the temperature of the air conditioning in a case that the intelligent service application determines that the body temperature of the user is lower than or equal to the temperature threshold based on the temperature information.

In a case that a large number of intelligent devices cooperates, the user needs to install intelligent device applications corresponding to respective intelligent devices, and a process of information interaction between the intelligent service application and each intelligent device application is complicated, thus the cooperation among multiple intelligent devices cannot be implemented effectively and simply, and control efficiency for the intelligent device is reduced.

SUMMARY

A method for controlling an intelligent device and an apparatus thereof are provided according to embodiments of the disclosure. The technical solution is as follows.

In one aspect, a method for controlling an intelligent device is provided. The method includes:
receiving a first intelligent device identification and first intelligent device state information transmitted by a first intelligent device;
determining a second intelligent device associated with the first intelligent device and a first target operation corresponding to the first intelligent device state information based on the first intelligent device identification, the first intelligent device state information, and a social application account which is currently logged into; and
transmitting a control message to the second intelligent device based on a second intelligent device identification and the first target operation, such that the second intelligent device performs the first target operation.

In another aspect, an apparatus for controlling an intelligent device is provided. The apparatus includes one or more processors and a storage medium storing operation instructions which when executed allow the processor to perform the following steps:
receiving a first intelligent device identification and first intelligent device state information transmitted by a first intelligent device;
determining a second intelligent device associated with the first intelligent device and a first target operation corresponding to the first intelligent device state information based on the first intelligent device identification, the first intelligent device state information and a social application account which is currently logged into; and
transmitting a control message to the second intelligent device based on a second intelligent device identification and the first target operation, such that the second intelligent device performs the first target operation.

In the embodiments of the disclosure, on receiving a first intelligent device identification and first intelligent device state information transmitted by a first intelligent device, a social application determines a second intelligent device associated with the first intelligent device and a first target operation corresponding to the first intelligent device state information based on the first intelligent device identification, the first intelligent device state information and a social application account which is currently logged into, and may control the second intelligent device based on a second intelligent device identification and the first target operation. In this way, the user merely needs to install the social application on the terminal without installing an intelligent device application corresponding to each intelligent device, thereby avoiding the information interaction between the social application and each intelligent device application. The operation is simple, cooperation of multiple intelligent devices may be implemented effectively and simply, and control efficiency for the intelligent device is improved.

BRIEF DESCRIPTION OF THE DRAWINGS

In order to illustrate the technical solutions according to the embodiments of the disclosure more clearly, drawings to be used in the description of embodiments will be described briefly hereinafter. Apparently, the drawings in the following description only illustrate some embodiments of the disclo

DETAILED DESCRIPTION OF THE EMBODIMENTS

To make the technical solutions of the disclosure clearer, embodiments of the disclosure are described in detail in conjunction with the accompanying drawings.

Figure 1:
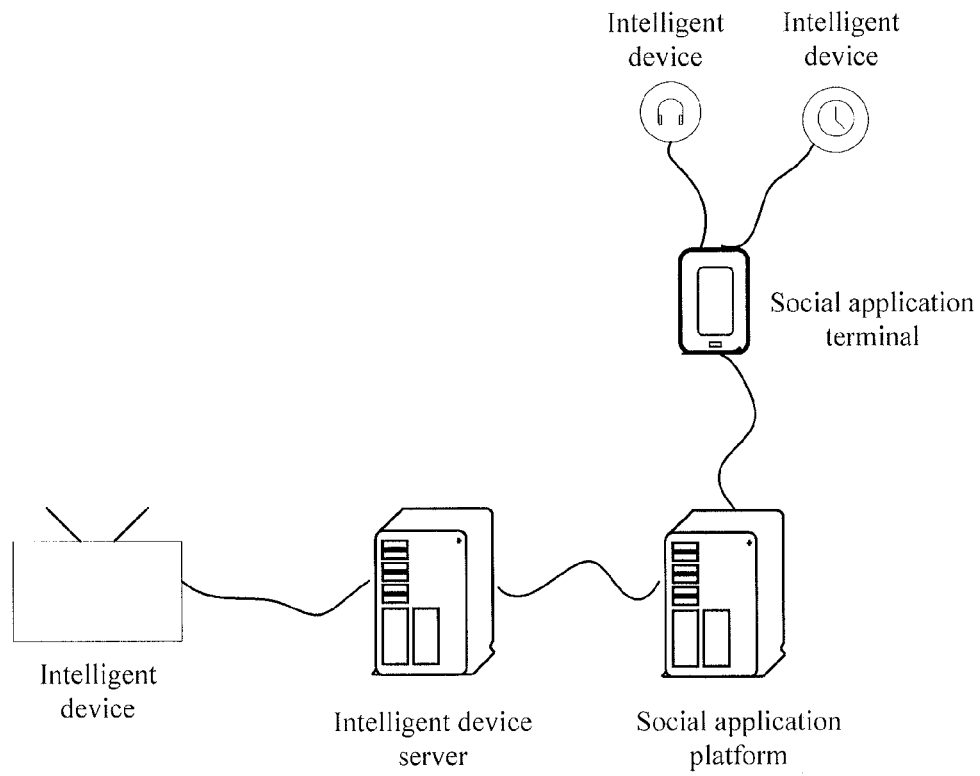
- FIG. 1 is a diagram of architecture of a system for controlling an intelligent device according to an embodiment of the disclosure.

FIG. 1 is a diagram of architecture of a system for controlling an intelligent device according to an embodiment of the disclosure. Referring to FIG. 1, the architecture of the system includes multiple intelligent devices, a social application terminal, a social application platform and an intelligent device server. Some of the multiple intelligent devices are able to directly communicate with a social application in the social application terminal, while some are unable to directly communicate with the social application in the social application terminal and need to communicate with the intelligent device sever corresponding to the intelligent device. Therefore, to facilitate the description, the multiple intelligent devices are classified into a first type of device and a second type of device. The first type of device is a device which is able to directly communicate with the social application in the social application terminal, while the second type of device is a device which is unable to directly communicate with the social application in the social application terminal but is able to communicate with the intelligent device sever corresponding to the intelligent device. In this case, the first type of device is connected to the social application terminal, the second type of device is connected to the intelligent device server, the social application terminal is connected to the social application platform, and the intelligent device server is also connected to the social application platform. The first type of device may be controlled by the social application platform through the social application in the social application terminal, and the second type of device may be controlled by the social application platform through the intelligent device server corresponding to the intelligent device.

In the embodiments of the disclosure, the intelligent device may be a terminal device capable of executing an application, such as an intelligent bracelet, an intelligent watch, and an intelligent earphone, which is not limited herein.

Figure 2:
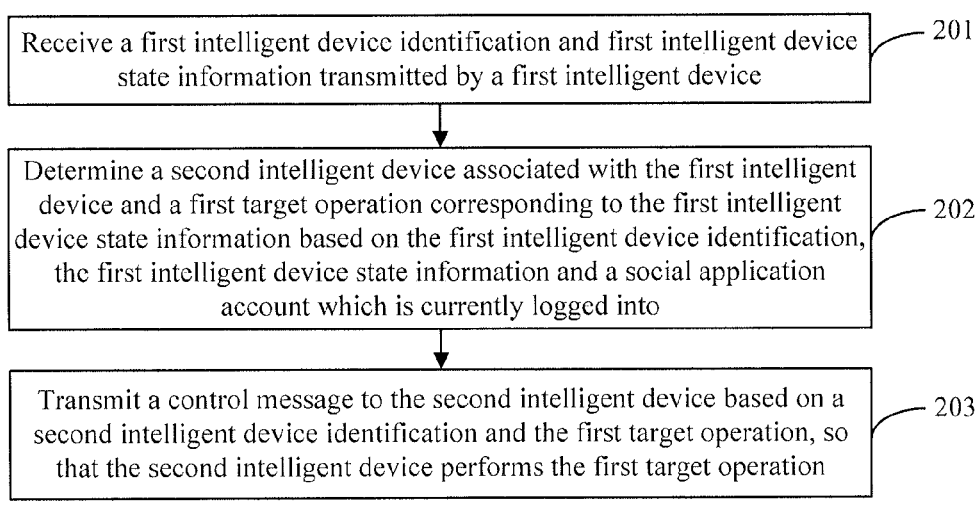
FIG. 2 is a flow chart of a method for controlling an intelligent device according to an embodiment of the disclosure.

FIG. 2 is a flow chart of a method for controlling an intelligent device according to an embodiment of the disclosure. Referring to FIG. 2, the method includes steps 201 to 203.

In step 201, a first intelligent device identification and first intelligent device state information transmitted by a first intelligent device are received.

In step 202, a second intelligent device associated with the first intelligent device and a first target operation corresponding to the first intelligent device state information are determined based on the first intelligent device identification, the first intelligent device state information and a social application account which is currently logged into.

In step 203, a control message is transmitted to the second intelligent device based on a second intelligent device identification and the first target operation, such that the second intelligent device performs the first target operation.

In the embodiments of the disclosure, on receiving a first intelligent device identification and first intelligent device state information transmitted by a first intelligent device, a social application determines a second intelligent device associated with the first intelligent device and a first target operation corresponding to the first intelligent device state information based on the first intelligent device identification, the first intelligent device state information and a social application account which is currently logged into, and may control the second intelligent device based on a second intelligent device identification and the first target operation. In this way, the user installs the social application on the terminal without installing an intelligent device application corresponding to each intelligent device, thereby avoiding the information interaction between the social application and each intelligent device application. The operation is simple, cooperation of multiple intelligent devices may be implemented effectively and simply, and control efficiency for the intelligent device is improved.

Optionally, the determining the second intelligent device associated with the first intelligent device and the first target operation corresponding to the first intelligent device state information based on the first intelligent device identification, the first intelligent device state information and the social application account which is currently logged into may include:

transmitting an association matching request to a social application platform, where the association matching request carries the first intelligent device identification, the first intelligent device state information and the social application account which is currently logged into;

receiving a second intelligent device trigger message returned by the social application platform, where the second intelligent device trigger message carries the second intelligent device identification and the first target operation; and determining an intelligent device corresponding to the second intelligent device identification as the second intelligent device associated with the first intelligent device.

Optionally, before the receiving the first intelligent device identification and the first intelligent device state information transmitted by the first intelligent device, the method further includes:

transmitting an device information acquisition request to the social application platform on receiving an intelligent device association instruction, such that the social application platform acquires an intelligent device information list bound to the social application account based on the social application account, where the device information acquisition request carries the social application account;

displaying the intelligent device information list on receiving the intelligent device information list transmitted by the social application platform;

receiving a first association confirmation instruction based on the intelligent device information list, where the first association confirmation instruction carries the first intelligent device identification, the second intelligent device identification, a first trigger condition and the first target operation, where the first trigger condition is to trigger the second intelligent 20, device to perform the first target operation; and transmitting a first association creation request, which carries the first intelligent device identification, the second intelligent device identification, the first trigger condition and the first target operation, to the social application platform, such that the social application platform stores a correspondence among the first intelligent device identification, the second intelligent device identification, the first trigger condition and the first target operation.

Optionally, before transmitting an device information acquisition request to the social application platform on receiving the intelligent device association instruction, the method further includes:

acquiring an intelligent device identification for any one of the first intelligent device and the second intelligent device on receiving an intelligent device binding instruction; and transmitting an intelligent device binding request, which carries the social application account and the intelligent device identification, to the social application platform, such that the social application platform stores a correspondence between the social application account and the intelligent device identification.

Optionally, after the transmitting the control message to the second intelligent device based on the second intelligent device identification and the first target operation, the method further includes:

creating an device information display interface;

acquiring first intelligent device association information and second intelligent device association information, where the first intelligent device association information includes the first intelligent device identification and the first intelligent device state information, and the second intelligent device association information includes the second intelligent device identification and the first target operation; and displaying the first intelligent device association information and the second intelligent device association information in the device information display interface.

Optionally, after the displaying the first intelligent device association information and the second intelligent device association information in the device information display interface, the method further includes:

receiving a state query message for any one of the first intelligent device and the second intelligent device, where the state query message carries the intelligent device identification;

transmitting a state query request to the intelligent device based on the intelligent device identification; and displaying intelligent device state information carried in a state query response on receiving the state query response transmitted by the intelligent device.

Optionally, before the creating the device information display interface, the method further includes:

detecting a state which a social application terminal is currently in; and pushing intelligent device association prompt information to the social application terminal in a case that the detected state is a screen-locked state, such that the social application terminal displays the intelligent device association prompt information.

Optionally, the method further includes:

displaying an device association recommendation message on receiving the device association recommendation message transmitted by the social application platform, where the device association recommendation message carries association information between a third intelligent device and a fourth intelligent device; and transmitting an device association recommendation confirmation message to the social application platform on receiving a second association confirmation instruction, such that the social platform stores a correspondence between a third intelligent device identification, a fourth intelligent device identification, a second trigger condition and a second target operation, where the second trigger condition is to trigger the fourth intelligent device to perform the second target operation.

The above optional technical solutions may be combined in many forms to form optional embodiments of the disclosure, which are not repeated herein.

Figure 3:
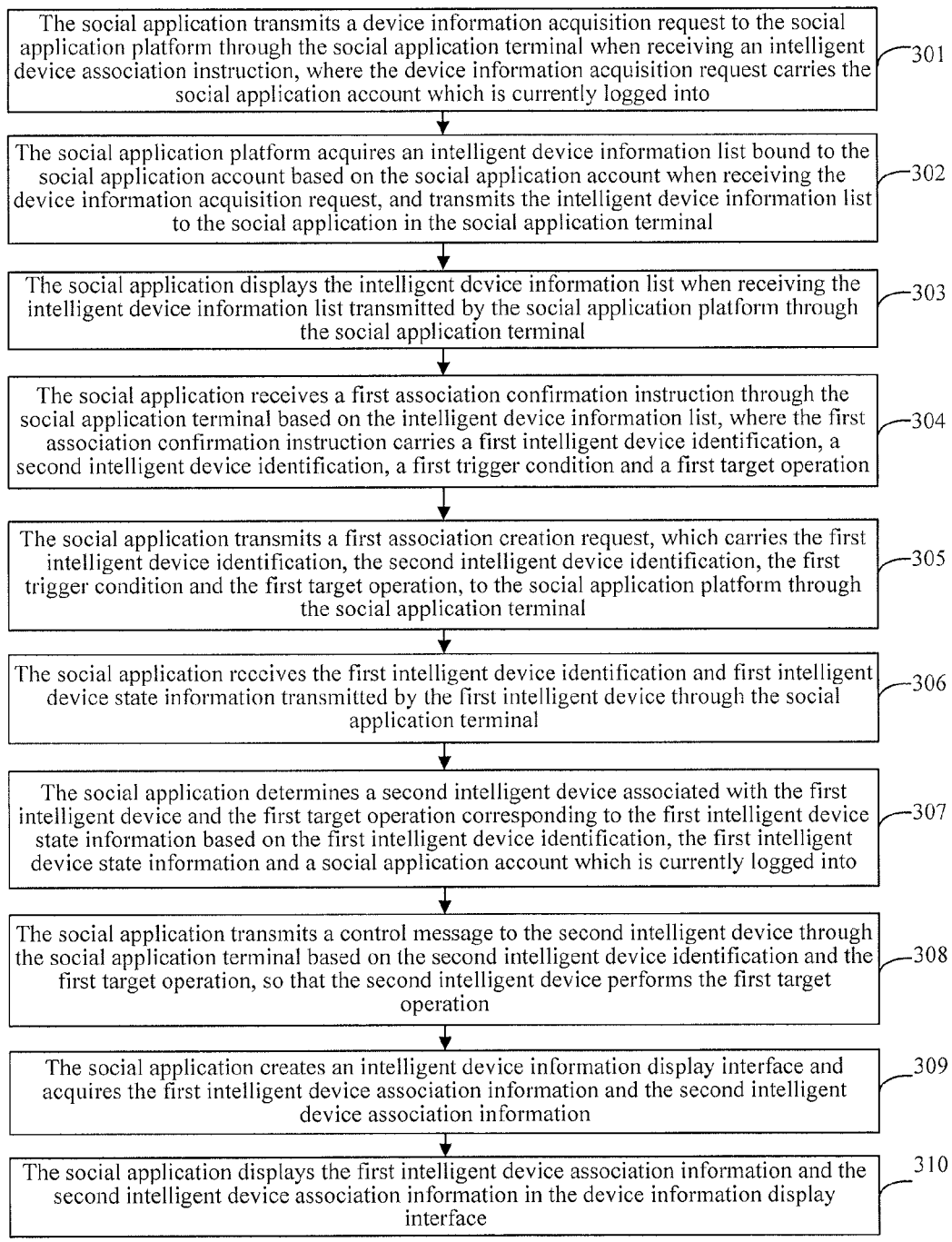
FIG. 3 is a flow chart of a method for controlling an intelligent device according to another embodiment of the disclosure.

FIG. 3 is a flow chart of a method for controlling an intelligent device according to an embodiment of the disclosure. Referring to FIG. 3, the method includes steps 301 to 310.

In step 301, the social application transmits a device information acquisition request to the social application platform through the social application terminal on receiving an intelligent device association instruction, where the device information acquisition request carries the social application account which is currently logged into.

Figure 4:
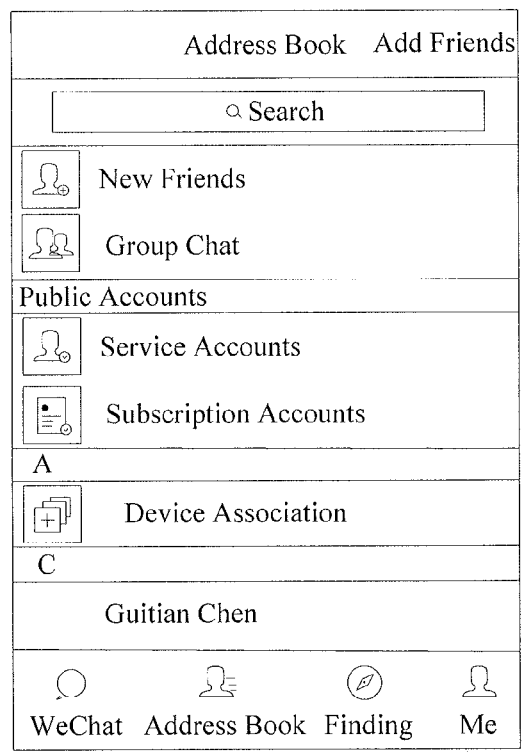
FIG. 4 is a diagram of a social application display interface according to an embodiment of the disclosure.
Figure 5:
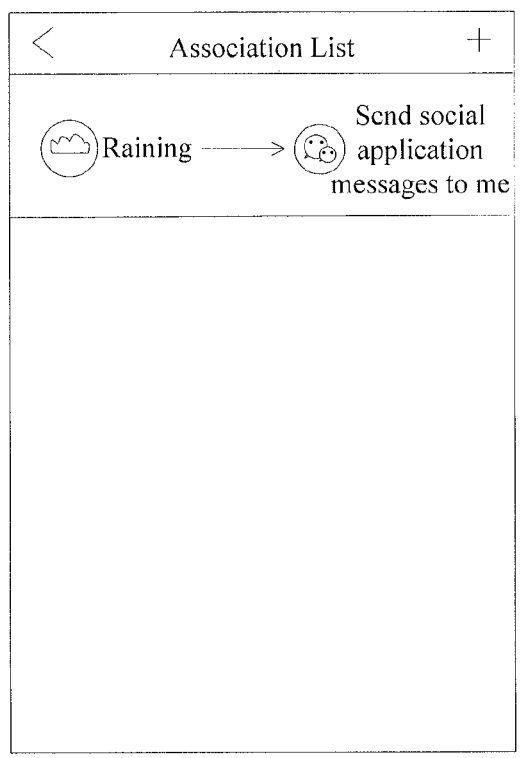
FIG. 5 is a diagram of an association list interface according to an embodiment of the disclosure.
Figure 6:
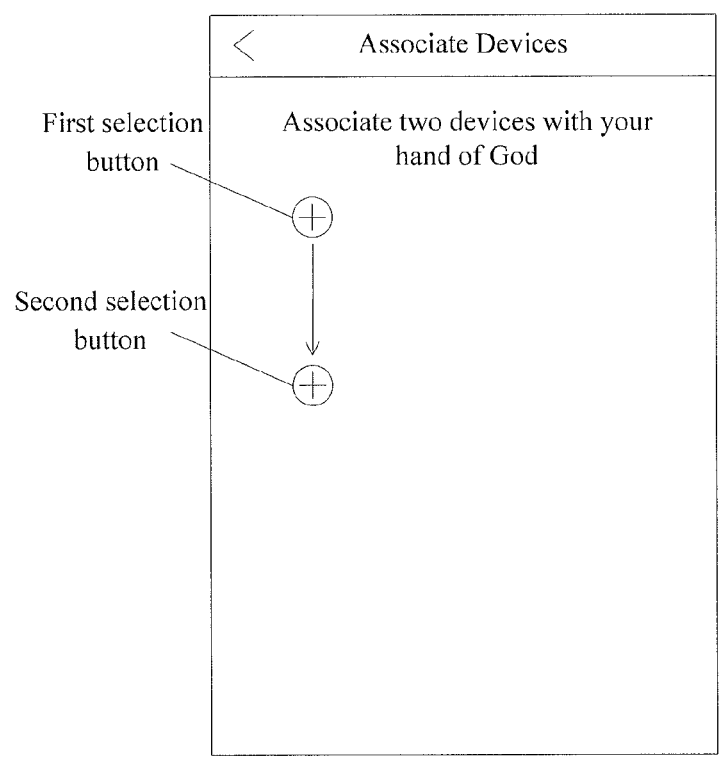
FIG. 6 is a diagram of an associate device interface according to an embodiment of the disclosure.

The social application terminal is a terminal on which the social application is installed, and the social application account is an account with which the social application terminal logged into the social application platform. The intelligent device association instruction is to associate multiple intelligent devices, and may be triggered by the user through a specific button. For example, the user may click a "device association" button as shown in FIG. 4, and an association list as shown in FIG. 5 is displayed once a viewing association list instruction is detected by the social application. Then the user may click an association button "+" as shown in the upper right corner of FIG. 5, and an association device interface as shown in FIG. 6 is displayed by the social application. There are two selection buttons shown in FIG. 6, and the intelligent device association instruction may be detected by the social application once the user clicks any one of the selection buttons.

In step 302, the social application platform acquires an intelligent device information list bound to the social application account based on the social application account on receiving the device information acquisition request, and transmits the intelligent device information list to the social application in the social application terminal.

Specifically, on receiving the device information acquisition request, the social application platform acquires a corresponding intelligent device identification from a stored correspondence between the social application account and the intelligent device identification based on the social application account. The social application platform acquires an intelligent device model number to which the intelligent device identification belongs, acquires corresponding intelligent device information from a stored correspondence between the intelligent device model number and the intelligent device information based on the intelligent device model number, generates an intelligent device information list based on the acquired intelligent device information, determines the generated intelligent device information list as the intelligent device list bound to the social application account, and transmits the intelligent device list to the social application in the social application terminal.

It should be noted that, the correspondence between the social application account and the intelligent device identification is stored once the social application platform binds the intelligent device to the social application account. Specifically, on receiving an intelligent device binding instruction, the social application acquires the intelligent device identification, and transmits an intelligent device binding request to the social application platform, where the intelligent device binding request carries the social application account and the intelligent device identification. On receiving the intelligent device binding request, the social application platform stores the social application account and the intelligent device identification into the correspondence between the social application account and the intelligent device identification.

The intelligent device identification uniquely identifies the intelligent device. The intelligent device identification may be, for example, a serial number of the intelligent device, which is not limited herein. The intelligent device identification may also be acquired through scanning a graphic code pasted to the intelligent device, where the graphic code may be a two dimensional code, a bar code or the like. Of course, the intelligent device identification may be acquired in other ways such as through manual input by the user, which is not limited herein either.

In addition, the correspondence between the intelligent device model number and the intelligent device information is stored in advance. That is, before controlling the intelligent device through the social application, the social application platform needs to authorize the intelligent device in advance. After the authorization is passed, the correspondence between the intelligent device model number and the intelligent device information is stored in the social application platform. It should be noted that, one intelligent device model number may correspond to multiple intelligent devices. That is, multiple intelligent devices may belong to a same intelligent device model number. However, identifications of the multiple intelligent devices are different and are to uniquely identify the intelligent devices. For example, a camera 1, a camera 2 and a camera 3 correspond to a model number 1, but the intelligent device identification of the camera 1 is ID1, the intelligent device identification of the camera 2 is ID2, and the intelligent device identification of the camera 3 is ID3.

In step 303, the social application displays the intelligent device information list on receiving the intelligent device information list transmitted by the social application platform through the social application terminal.

Figure 7:
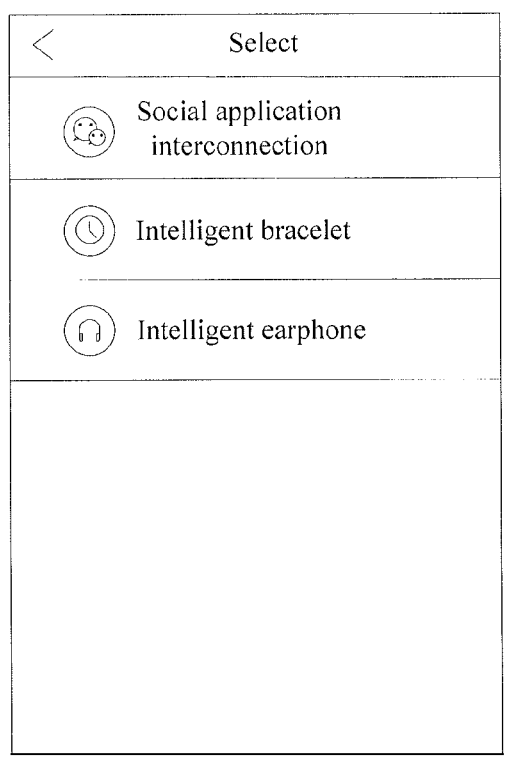
FIG. 7 is a diagram of an information list interface of an intelligent device according to an embodiment of the disclosure.

The intelligent device information list may include multiple intelligent devices. The intelligent device information for any one of the multiple intelligent devices may be displayed once the social application detects a device information viewing instruction through the social application terminal. For example, the multiple intelligent devices include a social application interconnection, an intelligent bracelet and an intelligent earphone. The intelligent device information list is shown in FIG. 7, where the intelligent device to which the social application interconnection corresponds is the social application platform, and the social application interconnection may transmit a message to the social application terminal through the social application platform.

The device information viewing instruction may be triggered by a specific operation performed by the user on the intelligent device, where the specific operation may be a single-click operation, a double-click operation, a slide operation or the like, which is not limited herein.

In step 304, the social application receives a first association confirmation instruction through the social application terminal based on the intelligent device information list, where the first association confirmation instruction carries the first intelligent device identification, a second intelligent device identification, a first trigger condition and a first target operation, where the first trigger condition is to trigger the second intelligent device to perform the first target operation.

After displaying the intelligent device information list, the social application stores the first intelligent device identification and the first trigger condition carried in a first selection confirmation instruction on receiving the first selection confirmation instruction through the social application terminal, stores the second intelligent device identification and the first target operation carried in a second selection confirmation instruction on receiving the second selection confirmation instruction through the social application terminal, and determines that the user needs to associate the first intelligent device with the second intelligent device on receiving the first association confirmation instruction through the social application terminal. In this case, the first intelligent device is determined as a triggering intelligent device, the second intelligent device is determined as a triggered intelligent device, and the first trigger condition is used as a condition to trigger the second intelligent device to perform the first target operation.

Figure 8:
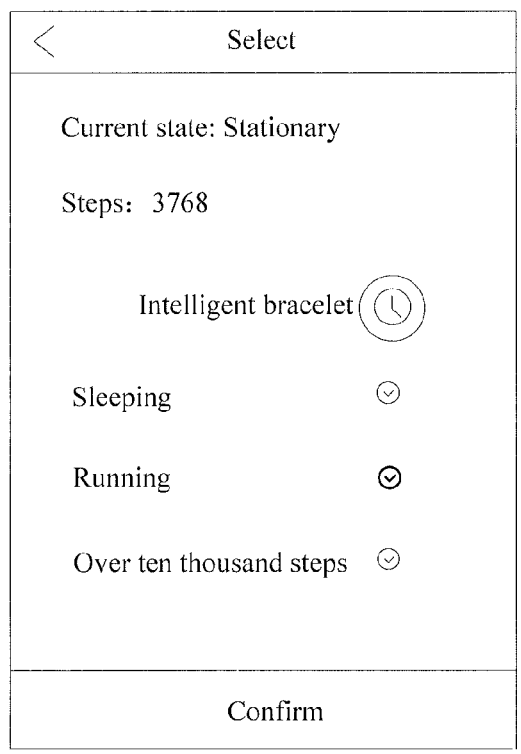
FIG. 8 is a diagram of a detailed information interface of an intelligent bracelet according to an embodiment of the disclosure.
Figure 9:
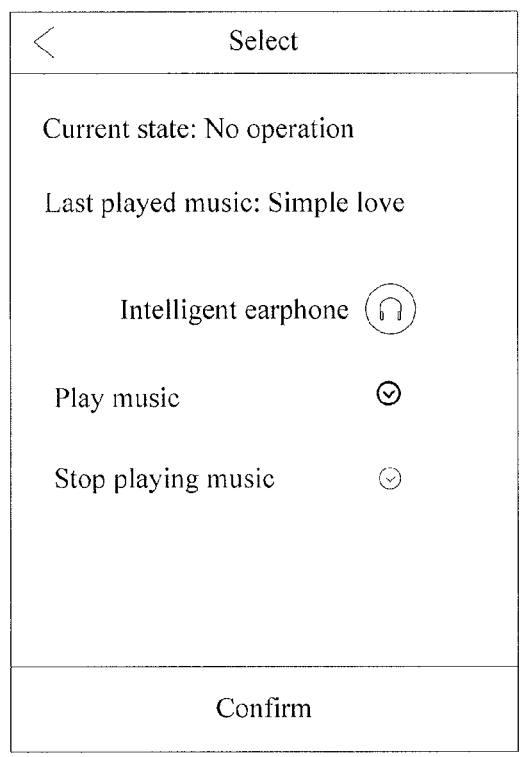
FIG. 9 is a diagram of a detailed information interface of an intelligent earphone according to an embodiment of the disclosure.
Figure 10:
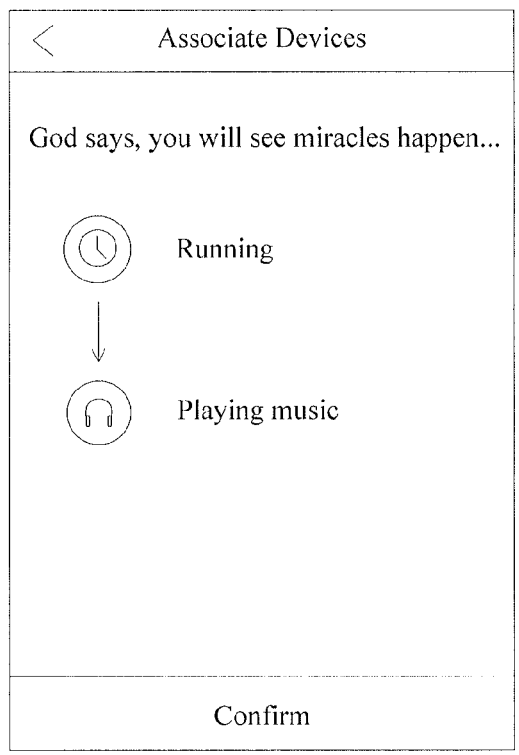
FIG. 10 is a diagram of an associate device interface according to another embodiment of the disclosure.

Based on the above examples, after the interface shown in FIG. 6 is displayed by the social application, the social application displays a detailed information interface for the intelligent bracelet as shown in FIG. 8 in a case that the user clicks a first selection button and selects the intelligent bracelet from the intelligent device information list shown in FIG. 7 as the first intelligent device. On receiving the first selection confirmation instruction through the social application terminal, the social application stores an intelligent bracelet identification and a first trigger condition carried in the first selection confirmation instruction as running. The social application displays a detailed information interface for the intelligent earphone as shown in FIG. 9 in a case that the user clicks a second selection button shown in FIG. 6 and selects the intelligent earphone from the intelligent device information list shown in FIG. 7 as the second intelligent device. On receiving the second selection confirmation instruction through the social application terminal, the social application stores an intelligent earphone identification and a first target operation carried by the second selection confirmation instruction as playing music, and displays a associate device interface shown in FIG. 10. Thereafter, the user may click a confirmation button shown in FIG. 10, such that the social application detects the first association confirmation instruction.

In step 305, the social application transmits a first association creation request, which carries the first intelligent device identification, the second intelligent device identification, the first trigger condition and the first target operation, to the social application platform through the social application terminal, such that the social application platform stores a correspondence among the first intelligent device identification, the second intelligent device identification, the first trigger condition and the first target operation.

Specifically, the social application transmits the first association creation request to the social application platform through the social application terminal, where the first association creation request carries the first intelligent device identification, the second intelligent device identification, the first trigger condition and the first target operation. On receiving the first association creation request, the social application platform stores the first intelligent device identification, the second intelligent device identification, the first trigger condition and the first target operation into a correspondence among a triggering intelligent device identification, a triggered intelligent device identification, the trigger condition and the target operation.

For example, a first intelligent device identification is ID1, a second intelligent device identification is ID2, the first trigger condition is running, and the first target operation is playing music. On receiving the first association creation request, the social application platform stores the first intelligent device identification ID1, the second intelligent device identification ID2, the first trigger condition which is running and the first target operation which is playing music into the correspondence among the triggering intelligent device identification, the triggered intelligent device identification, the trigger condition and the target operation as shown in Table 1 below.

TABLE 1

| triggering intelligent device identification | triggered intelligent device identification | trigger condition | target operation |
|---|---|---|---|
| ID1 | ID2 | running | playing music |
| ... | ... | ... | ... |

Figure 11:
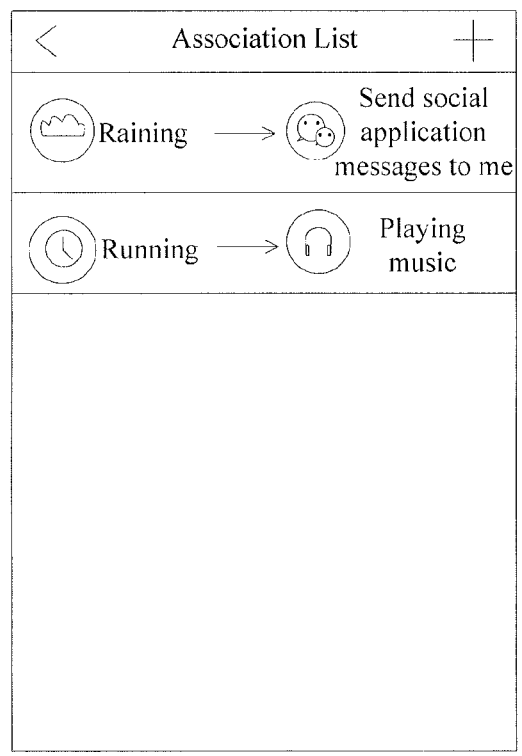
FIG. 11 is a diagram of an association list interface according to another embodiment of the disclosure.

After the first intelligent device is associated with the second intelligent device through the above steps, the association list shown by the social application may be as shown in FIG. 11. Thereafter, the social application may control the second intelligent device based on state information of the first intelligent device through the following steps 306 to 308.

In step 306, the social application receives the first intelligent device identification and first intelligent device state information transmitted by the first intelligent device through the social application terminal.

After being authorized in the social application platform, each of the intelligent devices only provides a function which has been authorized by the social application platform to the user. In addition, once the function authorized by the intelligent device is triggered, the intelligent device transmits the intelligent device identification and the intelligent device state information of the intelligent device to the social application through the social application terminal in a case that the intelligent device is the first type of device; or the intelligent device transmits corresponding intelligent device identification and intelligent device state information to the intelligent device server corresponding to the intelligent device in a case that the intelligent device is the second type of device. In the embodiments of the disclosure, assuming that the first intelligent device is the first type of device, the first intelligent device transmits the first intelligent device identification and the first intelligent device state information to the social application through the social application terminal once the function authorized by the first intelligent device is triggered.

The first intelligent device may be connected to the social application terminal via a Bluetooth connection or a mobile network, and communicate with the social application in the social application terminal.

In addition, the first intelligent device state information indicates a state that the first intelligent device is currently in.

In step 307, the social application determines the second intelligent device associated with the first intelligent device and the first target operation corresponding to the first intelligent device state information based on the first intelligent device identification, the first intelligent device state information and a social application account which is currently logged into.

Specifically, in a case that the second intelligent device is the second type of device, the social application transmits an association matching request to the social application platform through the social application terminal. The second intelligent device associated with the first intelligent device may be determined based on the association matching request which carries the first intelligent device identification, the first intelligent device state information and the social application account which is currently logged into. On receiving the association matching request, the social application platform generates a second intelligent device trigger message based on the first intelligent device identification, the first intelligent device state information and the social application account which is currently logged into. The social application receives the second intelligent device trigger message returned by the social application platform through the social application terminal, where the second intelligent device trigger message carries the second intelligent device identification and the first target operation, and determines an intelligent device corresponding to the second intelligent device identification as the second intelligent device associated with the first intelligent device.

The social application platform may generate the second intelligent device trigger message based on the first intelligent device identification, the first intelligent device state information and the social application account which is currently logged into in the following steps. The social application platform acquires corresponding device association information from the stored correspondence between the social application account and the device association information based on the social application account, where the correspondence among the triggering intelligent device identification, the triggered intelligent device identification, the trigger condition and the target operation is stored into the device association information; the social application platform determines the first intelligent device identification as the triggering intelligent device identification, and acquires at least one trigger condition from the device association information; the social application platform selects a trigger condition matching the first intelligent device state information from the at least one trigger condition based on the first intelligent device state information; the social application platform acquires the second intelligent device identification from the device association information based on the first intelligent device identification and the trigger condition matching the first intelligent device state information; the social application platform acquires the first target operation from the device association information based on first intelligent device identification, the second intelligent device identification and the trigger condition matching the first intelligent device state information; and the social application platform generates the second intelligent device trigger message based on the second intelligent device identification and the first target operation.

The second intelligent device identification may be a serial number, a name or the like of the second intelligent device, which is not limited herein.

In step 308, the social application transmits a control message to the second intelligent device through the social application terminal based on the second intelligent device identification and the first target operation, such that the second intelligent device performs the first target operation.

The combined operation between the first intelligent device and the second intelligent device is implemented after the social application transmits the control message to the second intelligent device through the social application terminal without the intelligent device application, thereby omitting the information interaction with the intelligent device application, and improving the control efficiency for the intelligent device.

Optionally, in a case that the second intelligent device is the second type of device, the steps 307 and 308 may be replaced by the following steps. The social application transmits an association matching request to the social application platform through the social application terminal, where the association matching request carries the first intelligent device identification, the first intelligent device state information and the social application account which is currently logged into. On receiving the association matching request, the social application platform generates the second intelligent device trigger message based on the first intelligent device identification, the first intelligent device state information and the social application account which is currently logged into. The social application platform transmits the second intelligent device trigger message to a second intelligent device server. On receiving the second intelligent device trigger message, the second intelligent device server transmits a control message to the second intelligent device based on the second intelligent device identification and the first target operation, such that the second intelligent device performs the first target operation.

Optionally, in the embodiments of the disclosure, in a case that the first intelligent device is the second type of device, the steps 306 to 308 may be replaced by the following steps. A first intelligent device server receives the first intelligent device identification and the first intelligent device state information transmitted by the first intelligent device; the first intelligent device server transmits the association matching request to the social application platform, where the association matching request carries the first intelligent device identification and the first intelligent device state information; on receiving the association matching request, the social application platform acquires a corresponding social application account from the stored correspondence between the social application account and the intelligent device identification based on the first intelligent device identification, and generates the second intelligent device trigger message based on the first intelligent device identification, the first intelligent device state information and the acquired social application account. In a case that the second intelligent device is the first type of device, the social application platform transmits the second intelligent device trigger message to the social application in the social application terminal; the social application receives the second intelligent device trigger message returned by the social application platform through the social application terminal, where the second intelligent device trigger message carries the second intelligent device identification and the first target operation; the social application transmits the control message to the second intelligent device based on the second intelligent device identification and the first target operation, such that the second intelligent device performs the first target operation. In a case that the second intelligent device is a second type of device, the social application platform transmits the second intelligent device trigger message to the second intelligent device server; on receiving the second intelligent device trigger message, the second intelligent device server transmits the control message to the second intelligent device based on the second intelligent device identification and the first target operation, such that the second intelligent device performs the first target operation.

After the second intelligent device is controlled to perform the first target operation in the above steps, the social application may display first intelligent device association information and second intelligent device association information through the following steps 309 and 310, so as to embody more user-friendly intelligent services.

In step 309, the social application creates a information display interface for the intelligent device, and acquires the first intelligent device association information and the second intelligent device association information, where the first intelligent device association information includes the first intelligent device identification and the first intelligent device state information, and the second intelligent device association information includes the second intelligent device identification and the first target operation.

Specifically, the social application creates the information display interface for the intelligent device, and for any intelligent device of the first intelligent device and the second intelligent device, the social application determines the first intelligent device identification and the first intelligent device state information transmitted by the first intelligent device as the first intelligent device association information in a case that the intelligent device is the first type of device, where the first type of device is a device which communicates with the social application; or the social application transmits an association information acquisition request to the social application platform through the social application terminal in a case that the intelligent device is the second type of device, where the association information acquisition request carries the intelligent device identification, the social application platform transmits the association information acquisition request to an intelligent device server, and the intelligent device server acquires corresponding intelligent device association information based on the intelligent device identification and transmits the acquired intelligent device association information to the social application platform, where the second type of device is a device which is unable to directly communicate with the social application but is able to communicate with the intelligent device sever.

In step 310, the social application displays the first intelligent device association information and the second intelligent device association information in the device information display interface.

In the embodiments of the disclosure, the first intelligent device association information and the second intelligent device association information may be displayed in the device information display interface in the form of a group chat, so as to visually display the information of the intelligent device in real time and introduce social elements to the intelligent device control.

Figure 12:
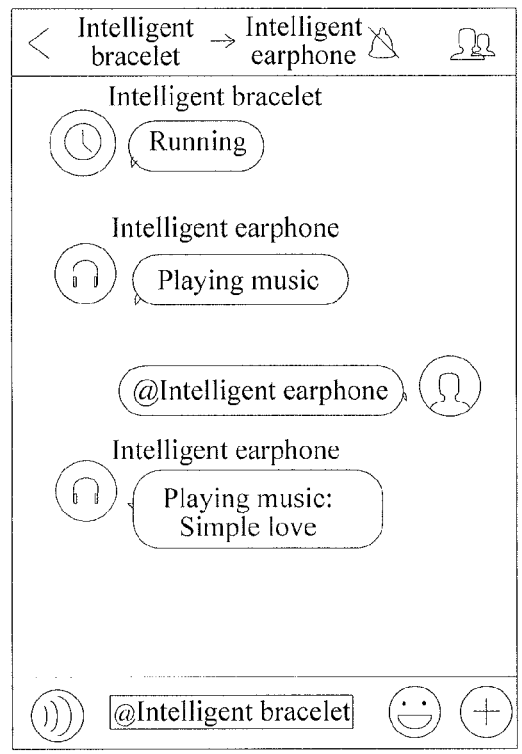
FIG. 12 is a diagram of a device information display interface according to an embodiment of the disclosure.

Further, after the first intelligent device association information and the second intelligent device association information are displayed in the intelligent device information display interface, the method further includes: for any intelligent device of the first intelligent device and the second intelligent device, receiving a state query message for the intelligent device, where the state query message carries the intelligent device identification, transmitting a state query request to the intelligent device based on the intelligent device identification in a case that the intelligent device is the first type of device, and displaying intelligent device state information carried in a state query response on receiving the state query response transmitted by the intelligent device; or transmitting the state query request to the social application platform in a case that the intelligent device is the second type of device, such that the social application platform acquires the state query response from the intelligent device server, and displaying the intelligent device state information carried in the state query response on receiving the state query response transmitted by the social application platform. For example, as shown in FIG. 12, the first intelligent device association information which is "intelligent bracelet, running" and the second intelligent device association information which is "intelligent earphone, playing music" shown in FIG. 12 are displayed, and the social application transmits the state query message to the intelligent device on receiving the state query message for the intelligent earphone which is "@ the intelligent earphone", and displays the intelligent device state information carried in the state query response which is "intelligent earphone, playing music: Simple love" on receiving the state query response transmitted by the intelligent device.

It should be noted that, in the embodiments of the disclosure, the state query message may be identified through a designated character, a designated voice or the like, which is not limited herein.

Optionally, before creating, by the social application, the intelligent device information display interface, the method further includes: detecting a state which a social application terminal is currently in; pushing, by the social application, intelligent device association prompt information to the social application terminal in a case that the detected state is a screen-locked state, such that the social application terminal displays the intelligent device association prompt information, and prompts the user to view the intelligent device association information through the intelligent device association prompt information.

Optionally, in the embodiments of the disclosure, the social application platform may associate intelligent devices based on active selection of the user, or may recommend an intelligent device association relationship to the user. Specifically, the social application platform acquires a corresponding intelligent device identification from the stored correspondence between the social application account and the intelligent device identification based on the social application account; the social application platform acquires an intelligent device model number to which the intelligent device identification belongs; the social application platform acquires corresponding intelligent device information from the stored correspondence between the intelligent device model number and the intelligent device information based on the acquired intelligent device model number; the social application platform transmits a device association recommendation message to the social application based on the acquired intelligent device information and device association information of a second user, where the device association recommendation message carries association information between a third intelligent device and a fourth intelligent device, a first user is a user corresponding to the social application account, the second user is a user other than the first user, and the third intelligent device and the fourth intelligent device are any two intelligent devices corresponding to the intelligent device information. The social application displays the device association recommendation message on receiving the device association recommendation message transmitted by the social application platform through the social application terminal, and transmits an device association recommendation confirmation message to the social application platform on receiving a second association confirmation instruction, such that the social application platform stores a correspondence among a third intelligent device identification, a fourth intelligent device identification, a second trigger condition and a second target operation, where the second trigger condition is to trigger the fourth intelligent device to perform the second target operation.

The transmitting the device association recommendation message to the social application based on the acquired intelligent device information and device association information of the second user may include the following steps. For the third intelligent device and the fourth intelligent device corresponding to the acquired intelligent device information, the number of the associated users is acquired based on the third intelligent device identification, the fourth intelligent device identification and the device association information of the second user, where the number of the associated users is the number of users among the second users who associate the third intelligent device with the fourth intelligent device and have a same second trigger condition; the number of associated user is divided by the number of the second users to acquire a association ratio; the device association recommendation message is generated based on the third intelligent device information and the fourth intelligent device information in a case that the association ratio is greater than a ratio threshold; and the device association recommendation message is transmitted to the social application.

In the embodiments of the disclosure, on receiving a first intelligent device identification and first intelligent device state information transmitted by a first intelligent device, a social application may determine a second intelligent device associated with the first intelligent device and a first target operation corresponding to the first intelligent device state information based on the first intelligent device identification, the first intelligent device state information and a social application account which is currently logged into, and may control the second intelligent device based on a second intelligent device identification and the first target operation. In this way, the user merely needs to install the social application on the terminal without installing an intelligent device application corresponding to each intelligent device, thereby avoiding the information interaction between the social application and each intelligent device application. The operation is simple, cooperation among multiple intelligent devices may be implemented effectively and simply, and control efficiency for the intelligent device is improved.

Figure 13:
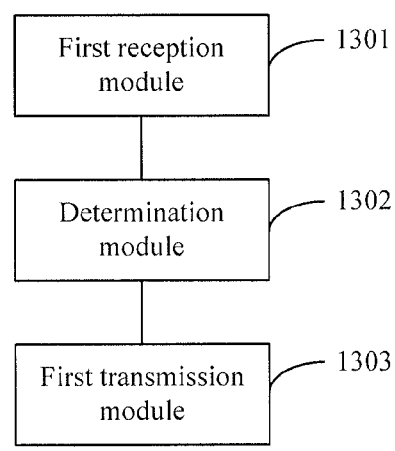
FIG. 13 is a structural diagram of an apparatus for controlling an intelligent device according to an embodiment of the disclosure.

FIG. 13 is a structural diagram of an apparatus for controlling an intelligent device according to an embodiment of the disclosure. Referring to FIG. 13, the apparatus includes a first reception module 1301, a determination module 1302, and a first transmission module 1303.

The first reception module 1301 is configured to receive a first intelligent device identification and first intelligent device state information transmitted by a first intelligent device.

The determination module 1302 is configured to determine a second intelligent device associated with the first intelligent device and a first target operation corresponding to the first intelligent device state information based on the first intelligent device identification, the first intelligent device state information and a social application account which is currently logged into.

The first transmission module 1303 is configured to transmit a control message to the second intelligent device based on a second intelligent device identification and the first target operation, such that the second intelligent device performs the first target operation.

Optionally, the determination module 1302 includes:
a transmission unit configured to transmit an association matching request to a social application platform, where the association matching request carries the first intelligent device identification, the first intelligent device state information and the social application account which is currently logged into;
a reception unit configured to receive a second intelligent device trigger message returned by the social application platform, where the second intelligent device trigger message carries the second intelligent device identification and the first target operation; and
a determination unit configured to determine an intelligent device corresponding to the second intelligent device identification as the second intelligent device associated with the first intelligent device.

Optionally, the device further includes:
a second transmission module configured to transmit a device information acquisition request to the social application platform on receiving an intelligent device association instruction, such that the social application platform acquires an intelligent device information list bound to the social application account based on the social application account, where the device information acquisition request carries the social application account;
a display module configured to display the intelligent device information list on receiving the intelligent device information list transmitted by the social application platform;
a second reception module configured to receive a first association confirmation instruction based on the intelligent device information list, where the first association confirmation instruction carries the first intelligent device identification, the second intelligent device identification, a first trigger condition and the first target operation, where the first trigger condition is to trigger the second intelligent device to perform the first target operation; and
a third transmission module configured to transmit a first association creation request, which carries the first intelligent device identification, the second intelligent device identification, the first trigger condition and the first target operation, to the social application platform, such that the social application platform stores a correspondence among the first intelligent device identification, the second intelligent device identification, the first trigger condition and the first target operation.

Optionally, the device further includes:
a first acquisition module configured to acquire, for any intelligent device of the first intelligent device and the second intelligent device, an intelligent device identification on receiving an intelligent device binding instruction; and
a fourth transmission module configured to transmit an intelligent device binding request, which carries the social application account and the intelligent device identification, to the social application platform, such that the social application platform stores a correspondence between the social application account and the intelligent device identification.

Optionally, the device further includes:
a creation module configured to create an device information display interface;
a second acquisition module configured to acquire first intelligent device association information and second intelligent device association information, where the first intelligent device association information includes the first intelligent device identification and the first intelligent device state information, and the second intelligent device association information includes the second intelligent device identification and the first target operation; and
a first display module configured to display the first intelligent device association information and the second intelligent device association information in the device information display interface.

Optionally, the device further includes:
a third reception module configured to receive, for any intelligent device of the first intelligent device and the second intelligent device, a state query message for the intelligent device, where the state query message carries the intelligent device identification;
a fifth transmission module configured to transmit a state query request to the intelligent device based on the intelligent device identification; and
a second display module configured to display intelligent device state information carried in a state query response on receiving the state query response transmitted by the intelligent device.

Optionally, the device further includes:
a detection module configured to detect a state which a social application terminal is currently in; and
a push module configured to push intelligent device association prompt information to the social application terminal in a case that the detected state is a screen-locked state, such that the social application terminal displays the intelligent device association prompt information.

Optionally, the device further includes:
a third display module configured to display an device association recommendation message on receiving the device association recommendation message transmitted by the social application platform, where the device association recommendation message carries association information between a third intelligent device and a fourth intelligent device, and
a sixth transmission module configure to transmit an device association recommendation confirmation message to the social application platform on receiving a second association confirmation instruction, such that the social application platform stores a correspondence among a third intelligent device identification, a fourth intelligent device identification, a second trigger condition and a second target operation, where the second trigger condition is to trigger the fourth intelligent device to perform the second target operation.

In the embodiments of the disclosure, on receiving a first intelligent device identification and first intelligent device state information transmitted by a first intelligent device, a social application may determine a second intelligent device associated with the first intelligent device and a first target operation corresponding to the first intelligent device state information based on the first intelligent device identification, the first intelligent device state information and a social application account which is currently logged into, and may control the second intelligent device based on a second intelligent device identification and the first target operation. In this way, the user merely needs to install the social application on the terminal without installing an intelligent device application corresponding to each intelligent device, thereby avoiding the information interaction between the social application and each intelligent device application. The operation is simple, cooperation among multiple intelligent devices may be implemented effectively and simply, and control efficiency for the intelligent device is improved.

It should be noted that, to allow the apparatus for controlling the intelligent device according to the above embodiments to control the intelligent device, the function modules are divided exemplarily, and in practical applications, the functions mentioned above may be assigned to different function modules as required for implementation, i.e., an internal structure of the device may be divided into different function modules, to implement all of or a part of the functions described above. In addition, the apparatus and method for controlling the intelligent device according to the above embodiments relate to the same concept, and for the implementation of the apparatus, the method embodiments may be referred to, which is not repeated herein.

Figure 14:
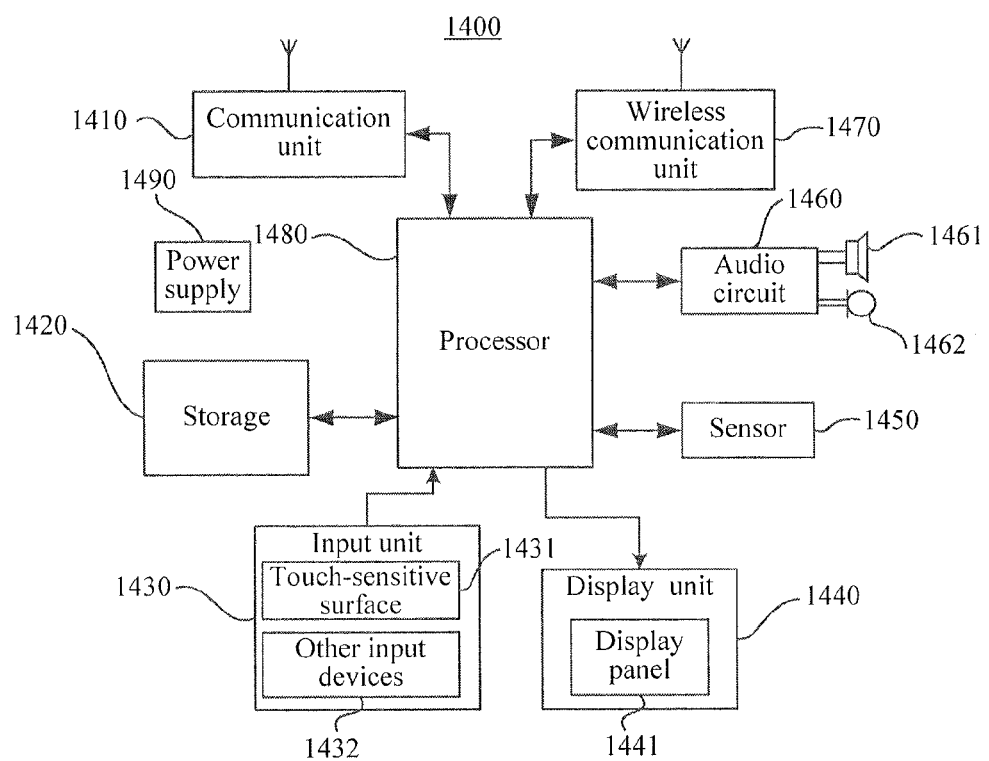
FIG. 14 is a structural diagram of a terminal according to an embodiment of the disclosure.

FIG. 14 is a structural diagram of a terminal on which the social application is installed according to an embodiment of the disclosure. The terminal 1400 may include a communication unit 1410, a storage 1420 including one or more computer-readable storage medium, an input unit 1430, a display unit 1440, a sensor 1450, an audio circuit 1460, a wireless communication unit 1470, a processor 1480 including one or more processing cores, a power supply 1490, or the like. It can be understood by those skilled in the art that the structure of the terminal shown in FIG. 14 is not intended to limit the terminal, more or less components than that shown in FIG. 14 may be included in the terminal, some components may be combined, or the components may be arranged in another way.

The communication unit 1410 may be configured to receive and transmit signals during information interaction or conversation. The communication unit 1410 may be a network communication device such as an RF (Radio Frequency, radio frequency) circuit, a router, or a modem. Specifically, in a case that the communication unit 1410 is an RF circuit, the RF circuit 1410 transmits downlink information to the one or more processors 1480 for processing after receiving the downlink information from a base station, and transmits uplink data to the base station. Generally, the RF circuit functioning as the communication unit includes, but is not limited to, an antenna, at least one amplifier, a tuner, one or more oscillators, a subscriber identity module (SIM) card, a transceiver, a coupler, a low noise amplifier (LNA), a duplexer, or the like. Further, the communication unit 1410 can communicate with a network or other devices via wireless communication. The wireless communication may be performed according to any communication standard or protocol, including but not limited to Global System of Mobile communication (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), e-mail, Short Messaging Service (Short Messaging Service, SMS), or the like. The storage 1420 can be configured to store a software program (s) and a module(s). Through running the software program (s) and module(s) stored in the storage 1420, the processor 1480 performs various function applications and data processing. The storage 1420 can mainly include a program storage area and a data storage area. The program storage area can store an operation system, an application required for at least one function (such as audio playing function, and image playing function), or the like. The data storage area can store data (such as audio data and telephone directory) created based on the usage of the terminal 1400, or the like. Further, the storage 1420 may include a high-speed random access memory, a non-volatile memory such as at least one disk storage device, flash storage device, or other volatile solid-state storage device. Accordingly, the storage 1420 may further include a storage controller for providing the processor 1480 and the input unit 1430 with the access to the storage 1420.

The input unit 1430 can be configured to receive an input number or character information, and generate keyboard signal input, mouse signal input, operating lever signal input, optical signal input or track ball signal input related to user setting and function control. Preferably, the input unit 1430 may include a touch-sensitive surface 1431 and other input devices 1432. The touch-sensitive surface 1431, also referred to as a touch display screen or touch panel, can acquire a touch operation (such as an operation of the user on the touch-sensitive surface 1431 or near the touch-sensitive surface 1431 through any suitable object or accessory such as a finger, a stylus) thereon or nearby performed by the user, and drive a correspondingly connected device based on a preset program. Optionally, the touch-sensitive surface 1431 may include a touch-detecting device and a touch controller. The touch-detecting device detects a touch position of the user and a signal caused by the touch operation, and sends the signal to the touch controller. The touch controller receives touch information from the touch-detecting device, converts the touch information into coordinates of the touch position, transmits the coordinates to the processor 1480, receives a command transmitted from the processor 1480 and executes the command. Further, the touch-sensitive surface 1431 can be implemented in various forms such as a resistive surface, a capacitive surface, an infrared surface and a surface acoustic wave surface. In addition to the touch-sensitive surface 1431, the input unit 1430 may further include other input devices 1432. Preferably, the other input devices 1432 may include, but is not limited to, one or more of a physical keyboard, a function key (such as a volume controlling key and a switching key), a track ball, a mouse, an operating lever, or the like.

The display unit 1440 can be configured to display information input by the user, information provided to the user, and various graphic user interface of the terminal 1400. The graphic user interface of the terminal 1400 can be composed of graphics, text, icon, video or any combination thereof. The display unit 1440 may include a display panel 1441. Optionally, the display panel 1441 can be configured by a liquid crystal display (Liquid Crystal Display, LCD), an organic light-emitting diode (Organic Light-Emitting Diode, OLED) or the like. Further, the display panel 1441 can be covered by the touch-sensitive surface 1431. Upon detecting the touch operation on or near the touch-sensitive surface 1431, the touch-sensitive surface 1431 transmits the touch information to the processor 1480 for determining a type of the touch event. Then the processor 1480 provides corresponding visual output on the display panel 1441 based on the type of the touch event. Although in FIG. 14 the touch-sensitive surface 1431 and the display panel 1441 perform the input function and the output function as two separate components, in some embodiments, the touch-sensitive surface 1431 and the display panel 1441 can be integrated to achieve the input function and the output function.

The terminal 1400 may further include at least one sensor 1450, such as an optical sensor, a motion sensor and another sensor. The optical sensor may include an ambient light sensor and a proximity sensor. The ambient light sensor can adjust the brightness of the display panel 1441 based on the intensity of ambient lights. The proximity sensor 1400 can turn off the display panel 1441 and/or the backlight once the terminal 1400 moves near the ear. As one kind of motion sensor, a gravity acceleration sensor can detect the magnitude of the acceleration in various directions (generally three axes) and detect the magnitude and direction of the gravity once remaining stationary. The gravity acceleration sensor may be applied to an application for recognizing posture of a mobile phone (for example, switching between landscape and portrait, relevant games, and magnetometer posture calibration), a function related to vibration recognition (for example, a pedometer, knocking) or the like. Other sensors, e.g., a gyroscope, a barometer, a hygrometer, a thermometer, and an infrared sensor, or the like may be further provided in the terminal 1400, which is not repeated herein.

The audio circuit 1460, the speaker 1461 and the microphone 1462 can provide an audio interface between the user and the terminal 1400. The audio circuit 1460 can transmit an electrical signal converted from received audio data to the speaker 1461, and the speaker 1461 converts the electric signal to a voice signal and outputs the voice signal. In another aspect, the microphone 1462 converts the acquired voice signal into an electrical signal, the audio circuit 1460 receives the electrical signal, converts the electrical signal into audio data, and outputs the audio data to the processor 1480 for processing. The processed audio data is transmitted to for example another terminal via the communication unit 1410. Alternatively, the audio data is outputted to the storage 1420 for further processing. The audio circuit 1460 may further include an earplug jack to provide communication between an external earphone and the terminal 1400.

To implement wireless communication, a wireless communication unit 1470 may be provided in the terminal. The wireless communication unit 1470 may be a Wireless Fidelity (WiFi) module. WiFi is a short-distance wireless transmission technology. Via the wireless communication unit 1470, the terminal 1400 can help the user to receive and send an e-mail, brows a web page, access a stream media, and provides the user with wireless wideband Internet access. Although the wireless communication unit 1470 is shown in the figure, it can be understood that the wireless communication unit 1470 is not a required component of the terminal 1400, and can be omitted as required without deviating from the scope of the spirit of the disclosure.

The processor 1480, is a control center of the terminal 1400, and is connected to various portions of the whole mobile phone via various interfaces and wires. Through running or performing the software program(s) and/or module(s) stored in the storage 1420 and calling data stored in the storage 1420, the processor 1480 performs various functions of the terminal 1400 and processes data, so as to monitor the whole mobile phone. Optionally, the processor 1480 may include one or more processing core. Preferably, the processor 1480 can be integrated with an application processor and a modem processor, where the application processor is mainly responsible for processing involved with the operating system, the user interface, the applications, or the like, while the modem processor is mainly responsible for processing involved with the wireless communication. It can be understood that, the modem processor mentioned above may be alternatively not integrated in the processor 1480.

The terminal 1400 further includes a power supply 1490 (such as a battery) for supplying power to various components. Preferably, the power supply can be logically connected to the processor 1480 via a power management system, so as to implement charging and discharging management and power management through the power management system. The power supply 1460 may further include any component such as one or more direct current power supply or alternating current power supply, a recharging system, a power supply failure detecting circuit, power supply converter or inverter, power supply state indicator.

Although not shown, the terminal 1400 may further include a camera, a Bluetooth module, or the like, which is not repeated herein.

In an embodiment, the terminal may further include one or more programs, which are stored in the storage and are configured to be processed by one or more processors. The one or more programs include instructions to implement the method for controlling the intelligent device according to the embodiments of the disclosure.

It should be understood by those skilled in the art that all or some of the steps in the embodiments may be performed through hardware or through corresponding hardware instructed by a program. The program may be stored in a computer-readable storage medium. The computer-readable storage medium may include a read only memory, a magnetic disk, a compact disk, or the like.

The foregoing embodiments are not intended to limit the present disclosure. Any change, equivalent substitution, improvement, or the like made within the spirit and principle of the present disclosure will fall within the scope of protection of the claims.

The invention claimed is:

1. A method for controlling an intelligent device, comprising:

receiving a first intelligent device identification and first intelligent device state information transmitted by a first intelligent device;

determining a second intelligent device associated with the first intelligent device and a first target operation corresponding to the first intelligent device state information based on the first intelligent device identification, the first intelligent device state information, and a social application account which is currently logged into; and transmitting a control message to the second intelligent device based on a second intelligent device identification and the first target operation, such that the second intelligent device performs the first target operation, wherein before the receiving the first intelligent device identification and the first intelligent device state information transmitted by the first intelligent device, the method further comprises:

transmitting a device information acquisition request to a social application platform on receiving an intelligent device association instruction, such that the social application platform acquires an intelligent device information list bound to the social application account based on the social application account, wherein the device information acquisition request carries the social application account;

displaying the intelligent device information list on receiving the intelligent device information list transmitted by the social application platform;

receiving a first association confirmation instruction based on the intelligent device information list, wherein the first association confirmation instruction carries the first intelligent device identification, the second intelligent device identification, a first trigger condition and the first target operation, wherein the first trigger condition is to trigger the second intelligent device to perform the first target operation; and transmitting a first association creation request, which carries the first intelligent device identification, the second intelligent device identification, the first trigger condition and the first target operation, to the social application platform, such that the social application platform stores a correspondence among the first intelligent device identification, the second intelligent device identification, the first trigger condition and the first target operation.

2. The method according to claim 1, wherein the determining the second intelligent device associated with the first intelligent device and the first target operation corresponding to the first intelligent device state information based on the first intelligent device identification, the first intelligent device state information, and the social application account which is currently logged into comprises:

transmitting an association matching request to the social application platform, wherein the association matching request carries the first intelligent device identification, the first intelligent device state information and the social application account which is currently logged into;

receiving a second intelligent device trigger message returned by the social application platform, wherein the second intelligent device trigger message carries the second intelligent device identification and the first target operation; and determining an intelligent device corresponding to the second intelligent device identification as the second intelligent device associated with the first intelligent device.

3. The method according to claim 1, wherein before transmitting the device information acquisition request to the social application platform on receiving the intelligent device association instruction, the method further comprises:

acquiring an intelligent device identification for any one of the first intelligent device and the second intelligent device on receiving an intelligent device binding instruction; and transmitting an intelligent device binding request, which carries the social application account and the intelligent device identification, to the social application platform, such that the social application platform stores a correspondence between the social application account and the intelligent device identification.

4. The method according to claim 1, wherein after the transmitting the control message to the second intelligent device based on the second intelligent device identification and the first target operation, the method further comprises:

creating an intelligent device information display interface;

acquiring first intelligent device association information and second intelligent device association information, wherein the first intelligent device association information comprises the first intelligent device identification and the first intelligent device state information, and the second intelligent device association information comprises the second intelligent device identification and the first target operation; and displaying the first intelligent device association information and the second intelligent device association information in the intelligent device information display interface.

5. The method according to claim 4, wherein after the displaying the first intelligent device association information and the second intelligent device association information in the intelligent device information display interface, the method further comprises:

receiving a state query message for any one of the first intelligent device and the second intelligent device, wherein the state query message carries an intelligent device identification;

transmitting a state query request to a queried intelligent device based on the intelligent device identification; and displaying intelligent device state information carried in a state query response on receiving the state query response transmitted by the queried intelligent device.

6. The method according to claim 4, wherein before the creating the intelligent device information display interface, the method further comprises:

detecting a state which a social application terminal is currently in; and pushing intelligent device association prompt information to the social application terminal in a case that the detected state is a screen-locked state, such that the social application terminal displays the intelligent device association prompt information.

7. The method according to claim 1, further comprising:

displaying a device association recommendation message on receiving the device association recommendation message transmitted by the social application platform, wherein the device association recommendation message carries association information between a third intelligent device and a fourth intelligent device, and transmitting an device association recommendation confirmation message to the social application platform on receiving a second association confirmation instruction, such that the social application platform stores a correspondence among a third intelligent device identification, a fourth intelligent device identification, a second trigger condition and a second target operation, wherein the second trigger condition is to trigger the fourth intelligent device to perform the second target operation.

8. An apparatus for controlling an intelligent device, comprising one or more processors and a storage medium storing operation instructions which when executed allow the one or more processors to perform the steps of:

receiving a first intelligent device identification and first intelligent device state information transmitted by a first intelligent device;

determining a second intelligent device associated with the first intelligent device and a first target operation corresponding to the first intelligent device state information based on the first intelligent device identification, the first intelligent device state information and a social application account which is currently logged into; and transmitting a control message to the second intelligent device based on a second intelligent device identification and the first target operation, such that the second intelligent device performs the first target operation, wherein before receiving the first intelligent device identification and the first intelligent device state information transmitted by the first intelligent device, the one or more processors further perform the steps of:

transmitting a device information acquisition request to a social application platform on receiving an intelligent device association instruction, such that the social application platform acquires an intelligent device information list bound to the social application account based on the social application account, wherein the device information acquisition request carries the social application account;

displaying the intelligent device information list on receiving the intelligent device information list transmitted by the social application platform;

receiving a first association confirmation instruction based on the intelligent device information list, wherein the first association confirmation instruction carries the first intelligent device identification, the second intelligent device identification, a first trigger condition and the first target operation, wherein the first trigger condition is to trigger the second intelligent device to perform the first target operation; and transmitting a first association creation request, which carries the first intelligent device identification, the second intelligent device identification, the first trigger condition and the first target operation, to the social application platform, such that the social application platform stores a correspondence among the first intelligent device identification, the second intelligent device identification, the first trigger condition and the first target operation.

9. The apparatus according to claim 8, wherein the determining the second intelligent device associated with the first intelligent device and the first target operation corresponding to the first intelligent device state information based on the first intelligent device identification, the first intelligent device state information, and the social application account which is currently logged into comprises:

transmitting an association matching request to the social application platform, wherein the association matching request carries the first intelligent device identification, the first intelligent device state information and the social application account which is currently logged into;

receiving a second intelligent device trigger message returned by the social application platform, wherein the second intelligent device trigger message carries the second intelligent device identification and the first target operation; and determining an intelligent device corresponding to the second intelligent device identification as the second intelligent device associated with the first intelligent device.

10. The apparatus according to claim 8, wherein the one or more processors further perform the steps of:

acquiring an intelligent device identification for any one of the first intelligent device and the second intelligent device on receiving an intelligent device binding instruction; and transmitting an intelligent device binding request, which carries the social application account and the intelligent device identification, to the social application platform, such that the social application platform stores a correspondence between the social application account and the intelligent device identification.

11. The apparatus according to claim 8, wherein the one or more processors further perform the steps of:

creating an device information display interface;

acquiring first intelligent device association information and second intelligent device association information, wherein the first intelligent device association information comprises the first intelligent device identification and the first intelligent device state information, and the second intelligent device association information comprises the second intelligent device identification and the first target operation; and displaying the first intelligent device association information and the second intelligent device association information in the device information display interface.

12. The apparatus according to claim 11, wherein the one or more processors further perform the steps of:

receiving a state query message of the intelligent device for any one of the first intelligent device and the second intelligent device, wherein the state query message carries the intelligent device identification;

transmitting a state query request to the intelligent device based on the intelligent device identification; and displaying intelligent device state information carried in a state query response on receiving the state query response transmitted by the intelligent device.

13. The apparatus according to claim 11, wherein the one or more processors further perform the steps of:

detecting a state which a social application terminal is currently in; and pushing intelligent device association prompt information to the social application terminal in a case that the detected state is a screen-locked state, such that the social application terminal displays the intelligent device association prompt information.

14. The apparatus according to claim 8, wherein the one or more processors further perform the steps of:

displaying a device association recommendation message on receiving the device association recommendation message transmitted by a social application platform, wherein the device association recommendation message carries association information between a third intelligent device and a fourth intelligent device, and transmitting an device association recommendation confirmation message to the social application platform on receiving a second association confirmation instruction, such that the social application platform stores a correspondence among a third intelligent device identification, a fourth intelligent device identification, a second trigger condition and a second target operation, wherein the second trigger condition is to trigger the fourth intelligent device to perform the second target operation.

15. A non-transient computer-readable storage medium, wherein the non-transient computer-readable storage medium stores computer-executable instructions which when executed by a computer cause the computer to perform the steps of:
    receiving a first intelligent device identification and first intelligent device state information transmitted by a first intelligent device;
    determining a second intelligent device associated with the first intelligent device and a first target operation corresponding to the first intelligent device state information based on the first intelligent device identification, the first intelligent device state information and a social application account which is currently logged into; and
    transmitting a control message to the second intelligent device based on a second intelligent device identification and the first target operation, such that the second intelligent device performs the first target operation,
    wherein before the receiving the first intelligent device identification and the first intelligent device state information transmitted by the first intelligent device, the computer performs the steps of:
    transmitting a device information acquisition request to a social application platform on receiving an intelligent device association instruction, such that the social application platform acquires an intelligent device information list bound to the social application account based on the social application account, wherein the device information acquisition request carries the social application account;
    displaying the intelligent device information list on receiving the intelligent device information list transmitted by the social application platform;
    receiving a first association confirmation instruction based on the intelligent device information list, wherein the first association confirmation instruction carries the first intelligent device identification, the second intelligent device identification, a first trigger condition and the first target operation, wherein the first trigger condition is to trigger the second intelligent device to perform the first target operation; and
    transmitting a first association creation request, which carries the first intelligent device identification, the second intelligent device identification, the first trigger condition and the first target operation, to the social application platform, such that the social application platform stores a correspondence among the first intelligent device identification, the second intelligent device identification, the first trigger condition and the first target operation.

16. The non-transient computer-readable storage medium according to claim 15, wherein when the computer-executable instructions for determining the second intelligent device associated with the first intelligent device and the first target operation corresponding to the first intelligent device state information based on the first intelligent device identification, the first intelligent device state information, and the social application account which is currently logged into are executed by the computer, the computer performs the steps of:
    transmitting an association matching request to a social application platform, wherein the association matching request carries the first intelligent device identification, the first intelligent device state information and the social application account which is currently logged into;
    receiving a second intelligent device trigger message returned by the social application platform, wherein the second intelligent device trigger message carries the second intelligent device identification and the first target operation; and
    determining an intelligent device corresponding to the second intelligent device identification as the second intelligent device associated with the first intelligent device.

17. The non-transient computer-readable storage medium according to claim 15, wherein before the computer-executable instructions for transmitting an device information acquisition request to the social application platform on receiving the intelligent device association instruction are executed by the computer, the computer further performs the steps of:
    acquiring an intelligent device identification for any intelligent device of the first intelligent device and the second intelligent device on receiving an intelligent device binding instruction; and
    transmitting an intelligent device binding request, which carries the social application account and the intelligent device identification, to the social application platform, such that the social application platform stores a correspondence between the social application account and the intelligent device identification.

* * * * *